(12) United States Patent
Chen et al.

(10) Patent No.: US 7,964,114 B2
(45) Date of Patent: Jun. 21, 2011

(54) IRON-BASED WATER GAS SHIFT CATALYST

(75) Inventors: Chao Chen, Panjin (CN); Eshan Li, Panjin (CN); Yanxia Wang, Panjin (CN); Yeping Cai, Louisville, KY (US); Chandra Ratnasamy, Louisville, KY (US); Jeffery E. Riley, Elizabeth, IN (US); Xueqin J. Wang, Louisville, KY (US); Shizhong Zhao, Louisville, KY (US); Jürgen R. Ladebeck, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 383 days.

(21) Appl. No.: 11/957,694

(22) Filed: Dec. 17, 2007

(65) Prior Publication Data
US 2009/0152500 A1    Jun. 18, 2009

(51) Int. Cl.
*C01B 3/38* (2006.01)
*C07C 1/02* (2006.01)
*B01J 23/00* (2006.01)
*B01J 21/00* (2006.01)
*B01J 20/00* (2006.01)

(52) U.S. Cl. ........ 252/373; 502/327; 502/329; 502/331; 502/332; 502/336; 502/338; 502/342; 502/343; 502/346; 502/355; 502/415; 502/439

(58) Field of Classification Search ............. 502/327, 502/329, 331, 332, 336, 338, 342, 343, 346, 502/355, 415, 439; 252/373
See application file for complete search history.

(56) References Cited

U.S. PATENT DOCUMENTS

| | | | | |
|---|---|---|---|---|
| 2,725,400 A * | 11/1955 | Mecorney et al. | 568/391 |
| 3,448,058 A * | 6/1969 | Arnold | 502/174 |
| 3,518,208 A * | 6/1970 | Schneider | 502/307 |
| 3,701,739 A * | 10/1972 | Bovarnick et al. | 502/318 |
| 4,088,736 A * | 5/1978 | Courty et al. | 423/230 |
| 4,105,590 A | 8/1978 | Koberstein et al. | |
| 4,110,359 A | 8/1978 | Marion | |
| 4,126,581 A * | 11/1978 | Sugier et al. | 502/342 |
| 4,143,083 A * | 3/1979 | Riesser | 585/600 |
| 4,152,300 A * | 5/1979 | Riesser | 502/302 |
| 4,504,596 A * | 3/1985 | Schoepe et al. | 502/225 |
| 4,598,061 A * | 7/1986 | Schneider et al. | 502/303 |
| 4,729,889 A * | 3/1988 | Flytani-Stephanopoulos et al. | 423/593.1 |
| 4,762,817 A * | 8/1988 | Logsdon et al. | 502/329 |
| 4,780,300 A * | 10/1988 | Yokoyama et al. | 423/418.2 |
| 4,788,175 A * | 11/1988 | Short et al. | 502/342 |
| 4,977,123 A * | 12/1990 | Flytzani-Stephanopoulos et al. | 502/84 |
| 5,120,700 A | 6/1992 | Matsuda et al. | |
| 5,128,307 A * | 7/1992 | Wanjek et al. | 502/342 |
| 5,155,086 A * | 10/1992 | Thakur et al. | 502/342 |
| 5,182,249 A * | 1/1993 | Wang et al. | 502/303 |
| 5,302,569 A * | 4/1994 | Horn et al. | 502/342 |
| 5,389,689 A | 2/1995 | Fujimoto et al. | |
| 5,453,412 A * | 9/1995 | Deckers et al. | 502/342 |
| 5,656,566 A * | 8/1997 | Ward | 502/316 |
| 5,705,715 A | 1/1998 | Darsow | |
| 5,710,349 A | 1/1998 | Furusaki et al. | |
| 5,714,644 A * | 2/1998 | Irgang et al. | 568/857 |
| 5,763,350 A | 6/1998 | Immel et al. | |
| 5,830,425 A | 11/1998 | Schneider et al. | |
| 5,945,569 A * | 8/1999 | Miki et al. | 568/801 |
| 5,965,099 A * | 10/1999 | Hartweg et al. | 423/213.5 |
| 5,977,010 A | 11/1999 | Roberts et al. | |
| 5,990,040 A * | 11/1999 | Hu et al. | 502/342 |
| 6,046,129 A * | 4/2000 | Duan et al. | 502/302 |
| 6,048,820 A * | 4/2000 | Takeuchi et al. | 502/244 |
| 6,107,233 A | 8/2000 | Harmer et al. | |
| 6,153,162 A * | 11/2000 | Fetzer et al. | 423/239.1 |
| 6,338,830 B1 | 1/2002 | Moskovitz et al. | |
| 6,548,704 B2 | 4/2003 | Funke et al. | |
| 6,562,315 B2 | 5/2003 | Korotkikh et al. | |
| 6,569,804 B1 | 5/2003 | Wei | |
| 6,576,217 B1 * | 6/2003 | Nojima et al. | 423/651 |
| 6,627,572 B1 * | 9/2003 | Cai et al. | 502/84 |
| 6,660,237 B2 | 12/2003 | Wang et al. | |
| 6,693,057 B1 * | 2/2004 | Cai et al. | 502/84 |
| 6,756,339 B1 | 6/2004 | Rokicki et al. | |
| 6,849,573 B2 * | 2/2005 | Haga et al. | 502/329 |
| 6,926,880 B2 * | 8/2005 | Holzle et al. | 423/648.1 |
| 7,033,972 B2 * | 4/2006 | Shikada et al. | 502/307 |
| 7,045,486 B2 | 5/2006 | Wang et al. | |
| 7,119,237 B2 * | 10/2006 | Prinz et al. | 568/885 |
| 7,387,983 B2 * | 6/2008 | Holzle et al. | 502/346 |
| 7,510,591 B2 * | 3/2009 | Huber-Dirr et al. | 75/233 |
| 7,759,530 B2 * | 7/2010 | Houssin et al. | 568/861 |
| 2001/0016188 A1 * | 8/2001 | Haga et al. | 423/648.1 |
| 2002/0041842 A1 * | 4/2002 | Ruettinger et al. | 423/230 |
| 2002/0169075 A1 * | 11/2002 | Holzle et al. | 502/342 |
| 2007/0131589 A1 * | 6/2007 | Weston et al. | 208/213 |
| 2008/0033218 A1 * | 2/2008 | Lattner et al. | 568/897 |
| 2009/0269269 A1 * | 10/2009 | White et al. | 423/437.2 |

* cited by examiner

FOREIGN PATENT DOCUMENTS

KR    0141999 B1    6/1998

OTHER PUBLICATIONS

International Preliminary Report on Patentability for PCT/US2008/013735.

*Primary Examiner* — Cam N Nguyen

(74) *Attorney, Agent, or Firm* — RatnerPrestia

(57) ABSTRACT

The present development is a catalyst for use in water gas shift processes, a method for making the catalyst and a method of using the catalyst. The catalyst is composed of iron oxide, copper oxide, zinc oxide, alumina, and optionally, potassium oxide, and is produced using a hydrothermal synthesis process. The catalyst demonstrates surprising activity for conversion of carbon monoxide under high to moderate temperature shift reaction conditions.

19 Claims, No Drawings

IRON-BASED WATER GAS SHIFT CATALYST

BACKGROUND

The present development is a catalyst for use in water gas shift processes. The catalyst comprises iron oxide, copper oxide, zinc oxide and alumina, and optionally, potassium oxide.

The water-gas-shift reaction is a well-known reaction suitable for production of hydrogen. Large volumes of hydrogen gas are needed for a number of important chemical reactions, and since the early 1940's, the water-gas-shift (WGS) reaction has represented an important step in the industrial production of hydrogen. For example, the industrial scale water-gas-shift reaction is used to increase the production of hydrogen for refinery hydro-processes and for use in the production of bulk chemicals such as ammonia, methanol, and alternative hydrocarbon fuels.

Typically, the catalysts used in the industrial scale water-gas-shift reaction include either an iron-chromium (Fe—Cr) metal combination or a copper-zinc (Cu—Zn) metal combination. The Fe—Cr oxide catalyst is typically used in industrial high temperature shift (HTS) converters. The industrial HTS converters—which have reactor inlet temperatures of from about 300° C. to about 380° C.—exclusively use the Fe-based catalysts because of their excellent thermal and physical stability, poison resistance and good selectivity. These attributes are especially beneficial when low steam to CO ratios are used and the formation of hydrocarbons is favored. Typically, the commercial catalysts are supplied in the form of pellets containing 8-12% $Cr_2O_3$ and a small amount of copper as an activity and selectivity enhancer. However, because of governmental regulations that pertain to chromium-comprising catalysts, it would be advantageous to have a water gas shift catalyst that demonstrates all the benefits of the prior art Fe—Cr catalyst but which does not require chromium in the composition.

The copper-based catalysts function well in systems where the $CO_2$ partial pressure can affect the catalyst performance, so the copper-based catalysts tend to demonstrate more favorable CO conversion at lower temperatures. However, unsupported metallic copper catalysts or copper supported on $Al_2O_3$, $SiO_2$, MgO, pumice or $Cr_2O_3$ tend to have relatively short lifespan (six to nine months) and low space velocity operation (400 to 1000 $h^{-1}$). The addition of ZnO or ZnO—$Al_2O_3$ can increase the lifetime of the copper-based catalysts, but the resultant Cu—Zn catalysts generally function in a limited temperature range of from about 200° C. to about 300° C. Further, Cu—Zn catalysts tend to be susceptible to poisoning by sulfur-containing compounds. Thus, merely using a Cu-based catalyst or a Cu—Zn catalyst in water gas shift processes is not a viable commercial option.

Thus, there is a need for a stable chromium-free iron-based water gas shift catalyst that performs as well as or better than the prior art iron-chromium catalysts.

SUMMARY OF THE PRESENT INVENTION

The present development is a catalyst for use in water gas shift processes, a method for making the catalyst and a method of using the catalyst. The catalyst comprises iron oxide, copper oxide, zinc oxide and alumina, and optionally, potassium oxide. The catalyst demonstrates surprising activity for conversion of carbon monoxide under high to moderate temperature shift reaction conditions, particularly when the reactor inlet temperatures ranges from about 250° C. to about 370° C.

The invention further comprises a process for the production of an $Fe_2O_3/CuO/ZnO/Al_2O_3$ catalyst. The catalyst is produced using a hydrothermal synthesis process. The process comprises combining salts of iron, copper, zinc and aluminum with an aqueous base solution while maintaining tight control of the reaction temperatures and pH.

DETAILED DESCRIPTION OF THE INVENTION

The present development is an $Fe_2O_3/CuO/ZnO/Al_2O_3$ catalyst intended to be used in water gas shift processes. Specifically, the catalyst comprises from 0.5 wt % to 15 wt % CuO, from 0.1 wt % to 15 wt % ZnO, from 0.5 wt % to 10 wt % $Al_2O_3$, and $Fe_2O_3$ to balance. (For the purposes of this writing, wt % is based on total weight of the finished catalyst.) In a preferred embodiment, the catalyst comprises from 1.5 wt % to 10 wt % CuO, from 1.5 wt % to 10 wt % ZnO, from 2.0 wt % to 8 wt % $Al_2O_3$, and $Fe_2O_3$ to balance. In a most preferred embodiment, the catalyst comprises from 3.5 wt % to 5.0 wt % CuO, from 3.0 wt % to 5.0 wt % ZnO, from 4.0 wt % to 6.0 wt % $Al_2O_3$, and $Fe_2O_3$ to balance. Optionally, potassium oxide may be included at concentrations up to 5 wt %, and preferably at a concentration of 0.1 wt % to 2.0 wt %, and most preferably at a concentration of 0.2 wt % to 1.0 wt %.

The method for preparing the catalyst does not provide for the addition of any chromium-containing materials, but chromium traces may be present, for example, in iron salts of technical purity and thus must be tolerated in the production of the catalysts according to the invention on a technical scale. Further, the method for preparing the catalyst does not provide for the addition of a zinc-aluminum spinel, nor does the method of preparation allow for a zinc-aluminum spinel to form. Thus, the finished catalyst is essentially free of zinc-aluminum spinel as determined by X-Ray Diffraction (XRD).

Generally, the catalyst of the present development is prepared by first preparing a first solution comprising soluble iron, copper, zinc and aluminum salts. A second basic solution is also prepared. The two solutions are then combined with deionized water in a mix tank at a predetermined temperature of less than about 65° C. while maintaining the pH of 4.0-12.0. After the solutions are combined, the mixture is held at a predetermined temperature up to about 100° C. for a predetermined time period. The mixture is then heated and held at the elevated temperature for several hours. The solids are washed, dried, and then calcined at 400° C.±100° C. for several hours. In an alternative embodiment, the second basic solution may be added to the water in the mix tank before the addition of the iron solution. In general, the precipitation step may be performed using co-precipitation, acid to base precipitation, or base to acid precipitation methods as are known in the art.

The soluble metal salts may include nitrate salts, sulfate salts, acetate salts, amine complexes, chloride salts, and other organic and inorganic salts known in the art to deliver iron, copper, zinc and/or aluminum to catalysts. The aluminum may further be added in the form of aluminum oxide, aluminum hydroxide, sodium aluminate and other aluminum compounds that are known in the art for addition of aluminum to catalysts. The basic solution may be prepared from sodium hydroxide, sodium carbonate, potassium hydroxide, potassium carbonate, ammonium hydroxide, ammonium carbonates, and other compounds known to produce basic aqueous solutions.

The resulting catalyst has a BET surface area of 50-150 $m^2/g$ and a pore volume of 0.15-0.45 cc/g.

The following are representative examples for making the catalyst of the present development. These examples are presented to further explain the invention and are not intended, or to be taken, to limit the scope of the invention.

EXAMPLE 1

A catalyst is prepared according to the invention by the following procedure: Ferrous sulfate heptahydrate (145 g) is dissolved in de-ionized (D.I.) water (365 ml). Aluminum nitrate nonahydrate (10.5 g) is dissolved in D.I. water (40 ml). The ferrous sulfate heptahydrate solution and the aluminum nitrate nonahydrate solution are combined, and 15.5% Cu (11.8 g) and 15.5% Zn (5.2 g) nitrate solutions are mixed with the ferrous sulfate and aluminum nitrate solutions. The mixed solution is then added into 10% NaOH solution (550 ml) over a 30 minute period, with stirring. The solution is heated to about 65° C. and held for at least two hours. The resulting suspension is filtered. The precipitate is washed 4 times with D.I. water followed by drying at 110° C. for about four hours. The dried powder is calcined at about 400° C. for approximately three hours and the powder is then mixed with 1.5 g graphite. The mixed powders are tabbed.

EXAMPLE 2

A catalyst is prepared according to the invention by the following procedure: 10.2% ferrous nitrate solution (2190 g), 15.5% Cu nitrate solution (96 g), 15.5% Zn nitrate solution (32 g) and 4.5% Al nitrate solution (236 g) are mixed in a 3000 ml beaker. The mixed solution is added into 20% $NH_4OH$ solution (350 ml) over about a 10 minute period, with stirring, followed by heating to about 85° C. and holding at temperature for about two hours. The resulting suspension is filtered. The precipitate is washed three times with D.I. water. 4.7 g potassium nitrate solution (43%) is added into the cake. The cake is then dried at 110° C. for about four hours followed by calcination at about 300° C. for approximately four hours. The calcined powder is mixed with 20 g graphite and tabbed.

EXAMPLE 3

A catalyst is prepared according to the invention by the following procedure: 357 ml Cu amine (0.14 g/l), 143 ml Zn amine (0.14 g/l) and 83 g alumina powder are added into about 1900 ml $NH_4OH$ solution (0.2 g/ml). After stirring thoroughly, 6154 ml ferrous nitrate solution (0.13 g/ml) is added to the $NH_4OH$ solution. The suspension is then heated to about 80° C. and held for six hours. After washing and filtrating four times, 6.44 g potassium nitrate and 30 g graphite are mixed into the slurry. The slurry then is spray-dried followed by calcination with rotation furnace (zone-1, 260° C. and zone-2, 350° C.). The calcined powder is tabbed.

EXAMPLE 4

A catalyst is prepared according to the invention by the following procedure: Ferric nitrate nonahydrate (221 g) is dissolved in 720 ml D.I. water. 15.5% Cu nitrate solution (12.9 g), 15.5% Zn nitrate solution (6.5 g) and aluminum nitrate powder (18.3 g) are added into the ferric nitrate solution. Then the mixed solution is pumped into a precipitation tank containing 250 ml NaOH solution (25%). The precipitation tank is heated to 60° C. and held for 5 hours. The resulting suspension is filtered and washed four times. The cake is dried at 110° C. for 3 hours followed by calcination at 400° C. for four hours. The calcined powder is then tabbed.

EXAMPLE 5

A catalyst is prepared according to the invention by the following procedure: Ferric sulfate (75.4 g) is dissolved in 500 ml D.I. water. Ferrous sulfate (41.8 g) is dissolved in 122 ml D.I. water. 10.5 g aluminum nitrate is dissolved in 35 ml D.I. water. The ferric sulfate, ferrous sulfate and aluminum nitrate solutions are mixed in a first vessel, and a 15.5% Cu nitrate (13 g) solution and 15.5% Zn nitrate (5 g) solution are also mixed into the first vessel. 10% NaOH (500 ml) is prepared in second vessel. The solutions from the first vessel and second vessel are added simultaneously to a precipitation tank over about a 30 minute period. The temperature is increased to 65° C. and held for about two hours. The resulting suspension is filtered and washed four times with D.I. water followed by drying at 110° C. for about four hours. The dried powder is calcined at 400° C. for three hours before mixed with 1.5 g graphite.

EXAMPLE 6

A catalyst is prepared according to the invention by the following procedure: 55 g aluminum nitrate is dissolved in 180 ml D.I. water. 34 g Cu nitrate solution (15.5%) and 20 g Zn nitrate solution (15.5%) along with the above aluminum nitrate solution are added into 962 g ferrous nitrate solution (9.5%). The mixed solution and 300 ml NaOH solution (25%) are simultaneously added into a precipitation tank with stirring over a 40 minute period. The temperature is then increased to 65° C. and held for five hours. The resulting suspension is filtered and washed four times with D.I. water followed by drying at 110° C. for four hours. The dried powder is calcined at 400° C. for three hours before mixed with 4.5 g graphite. The mixed powders are tabbed.

EXAMPLE 7

A catalyst is prepared according to the invention by essentially the same procedure as in Example 6 except 82.5 g aluminum nitrate and no Zn nitrate solution are used.

EXAMPLE 8

A catalyst is prepared according to the invention by essentially the same procedure as in Example 6 except 51 g Cu nitrate solution (15.5%) and no Zn nitrate solution are used.

The catalyst is preferably used in a typical water gas shift process. Typical reaction conditions for the process would include inlet temperatures equal to or greater than 200° C., feed pressure equal to or greater than 1 atm, and a space velocity greater than about 1000/hr, and a steam to gas ratio of greater than 0.2. The concentration of the carbon monoxide in the feed gas can vary depending on the technical process of producing the gas to be converted. The exit carbon monoxide concentration is expected to be at equilibrium.

In the water gas shift process, the chromium-free iron-based catalyst of the present invention demonstrates surprisingly improved activity and CO conversion as compared to prior art Fe—Cr catalysts designed for the same purpose. In an exemplary embodiment of the present invention, the catalyst of Example 6 is prepared. The resulting catalyst has a BET surface area of 67 $m^2/g$ and a pore volume of 0.28 cc/g. A prior art catalyst is prepared according to U.S. Pat. No. 7,037,876 Example 1, and comprising about 8 wt % $Cr_2O_3$ and 2.5 wt % CuO and 89.5 wt % $Fe_2O_3$. The resulting catalyst has a BET surface area of 75 $m^2/g$ and a pore volume of 0.26 cc/g. (U.S. Pat. No. 7,037,876 is incorporated herein in its entirety by reference.)

Each catalyst is packed in a fixed bed reactor having an inlet temperature that can be adjusted from 250° C. to 370° C. A dry feed comprising 8% CO, 13% $CO_2$, 24% $N_2$ and balanced with $H_2$ is fed through the catalyst bed at a pressure of 150 psig and a steam to gas ratio of 0.6. The CO conversion is measured for each catalyst at varying inlet temperatures ranging from 250° C. to 370° C. As indicated in Table I, the inventive catalyst demonstrates significantly greater CO conversion at every inlet temperature tested.

TABLE I

| Inlet Temp (° C.) | Prior Art Catalyst % CO Conversion | Inventive Catalyst % CO Conversion |
| --- | --- | --- |
| 250 | 3 | 28 |
| 275 | 3 | 35 |
| 300 | 9 | 58 |
| 325 | 23 | 69 |
| 370 | 42 | 70 |

Using the same catalyst compositions, the activity is measured at 370° C. for the fresh catalyst and for the same catalysts after the catalyst has been heat treated for 24 hours at 530° C. The fresh prior art catalyst has a CO conversion of 42%, which decreases to 29% after heat treatment. Even with heat treatment the inventive catalyst retains greater activity: the fresh inventive catalyst has a CO conversion of 70%, which decreases to 43% after heat treatment.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A catalyst for use in a water gas shift reaction operated at an inlet temperature equal to or greater than 200° C., a feed pressure equal to or greater than 1 atm, a space velocity greater than about 1000/hr, and a steam to gas ratio of greater than 0.2, the catalyst consisting essentially of from 0.5 wt % to 15 wt % CuO, from 0.1 wt % to 15 wt % ZnO, from 0.5 wt % to 10 wt % $Al_2O_3$, with $Fe_2O_3$ to balance, wherein the catalyst has a BET surface area of 50-150 $m^2/g$.

2. The catalyst of claim 1 wherein said CuO comprises from 1.5 wt % to 10 wt % of said catalyst.

3. The catalyst of claim 2 wherein said CuO comprises from 3.5 wt % to 5.0 wt % of said catalyst.

4. The catalyst of claim 1 wherein said ZnO comprises from 1.5 wt % to 10 wt % of said catalyst.

5. The catalyst of claim 4 wherein said ZnO comprises from 3.0 wt % to 5.0 wt % of said catalyst.

6. The catalyst of claim 1 wherein said $Al_2O_3$ comprises from 2.0 wt % to 8 wt % of said catalyst.

7. The catalyst of claim 6 wherein said $Al_2O_3$ comprises from 4.0 wt % to 6.0 wt % of said catalyst.

8. The catalyst of claim 1 wherein said catalyst is characterized by an absence of chromium-containing raw materials during production.

9. The catalyst of claim 1 wherein said catalyst has an absence of zinc-aluminum spinel.

10. The catalyst of claim 1 prepared by the steps:
(a) preparing a first solution comprising salts of iron compounds, copper compounds, zinc compounds and aluminum compounds, and preparing a second solution comprising an aqueous base solution;
(b) combining the first and second solutions with deionized water in a mixing tank while maintaining the pH;
(c) holding the mixture for a predetermined time period, then heating the mixture and holding the mixture at an elevated temperature until solids form;
(d) washing the solids;
(e) drying the washed solids; and
(f) calcining the dried solids to obtain the catalyst.

11. The catalyst of claim 10 wherein said second solution is added to said deionized water before said first solution is added to said deionized water.

12. The catalyst of claim 10 wherein said first solution is added to said deionized water before said second solution is added to said deionized water.

13. The catalyst of claim 10 wherein the salts of iron compounds, copper compounds, zinc compounds and aluminum compounds are selected from the group consisting of iron nitrates, iron sulfates, iron acetates, iron amines, iron chlorides, copper nitrates, copper sulfates, copper acetates, copper amines, copper chlorides, zinc nitrates, zinc sulfates, zinc acetates, zinc amines, zinc chlorides, aluminum nitrates, aluminum sulfates, aluminum acetates, aluminum chlorides, alumina oxide, alumina hydroxide, sodium aluminate, and combinations thereof.

14. The catalyst of claim 10 wherein the aqueous base solution comprises water and a base selected from the group consisting of NaOH, KOH, $Na_2CO_3$, $K_2CO_3$, $NH_4OH$, and $(NH_4)_2CO_3$, $NaHCO_3$, $KHCO_3$, $NH_4HCO_3$ and urea.

15. A method of using the catalyst of claim 1 in a water gas shift process wherein said catalyst is packed in a fixed bed reactor, and wherein a feed comprising steam, carbon monoxide, carbon dioxide, nitrogen and hydrogen is fed through said catalyst bed.

16. A water gas shift catalyst comprising from 0.5 wt % to 15 wt % CuO, from 0.1 wt % to 15 wt % ZnO, from 0.5 wt % to 10 wt % $Al_2O_3$, with $Fe_2O_3$ to balance, wherein said catalyst has an absence of zinc-aluminum spinel, said catalyst is prepared without the use of chromium-containing raw materials, said catalyst has a BET surface area of 50-150 $m^2g$, and said catalyst is used in a water gas shift reaction operated at an inlet temperature equal to or greater than 200° C., a feed pressure equal to or greater than 1 atm, a space velocity greater than about 1000/hr, and a steam to gas ratio of greater than 0.2.

17. The catalyst of claim 16 wherein said CuO comprises from 1.5 wt % to 10 wt %, said ZnO comprises from 1.5 wt % to 10 wt %, and said $Al_2O_3$ comprises from 2.0 wt % to 8 wt % of said catalyst.

18. The catalyst of claim 16 wherein said CuO comprises from 3.5 wt % to 5.0 wt %, said ZnO comprises from 3.0 wt % to 5.0 wt %, and said $Al_2O_3$ comprises from 4.0 wt % to 6.0 wt % of said catalyst.

19. A water gas shift catalyst comprising copper oxide, zinc oxide, alumina, and iron oxide prepared by the steps:
(a) preparing a first solution consisting essentially of salts of iron compounds, copper compounds, zinc compounds and aluminum compounds, and preparing a second solution comprising an aqueous base solution, wherein neither said first solution nor said second solution comprise chromium-based raw materials;
(b) combining the first and second solutions with deionized water in a mixing tank while maintaining the pH;
(c) holding the mixture for a predetermined time period; then heating the mixture and holding the mixture at an elevated temperature until solids form;

(d) washing the solids;

(e) drying the washed solids; and (f) calcining the dried solids to obtain the catalyst, wherein said catalyst has a BET surface area of 50-150 m$^2$/g, and said catalyst is used in a water gas shift reaction operated at an inlet temperature equal to or greater than 200° C., a feed pressure equal to or greater than 1 atm, a space velocity greater than about 1000/hr, and a steam to gas ratio of greater than 0.2.

* * * * *